(12) United States Patent
Park et al.

(10) Patent No.: US 12,255,331 B2
(45) Date of Patent: *Mar. 18, 2025

(54) LITHIUM-SULFUR SECONDARY BATTERY

(71) Applicant: LG ENERGY SOLUTION, LTD., Seoul (KR)

(72) Inventors: Intae Park, Daejeon (KR); Doo Kyung Yang, Daejeon (KR); Youngcheol Choi, Daejeon (KR); Soohyun Kim, Daejeon (KR); Changhoon Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 963 days.

This patent is subject to a terminal disclaimer.

(21) Appl. No.: 16/971,177

(22) PCT Filed: Oct. 24, 2019

(86) PCT No.: PCT/KR2019/014039
§ 371 (c)(1),
(2) Date: Aug. 19, 2020

(87) PCT Pub. No.: WO2020/085811
PCT Pub. Date: Apr. 30, 2020

(65) Prior Publication Data
US 2021/0104745 A1   Apr. 8, 2021

(30) Foreign Application Priority Data

Oct. 26, 2018   (KR) .................. 10-2018-0128729
Oct. 22, 2019   (KR) .................. 10-2019-0131538

(51) Int. Cl.
*H01M 4/58*   (2010.01)
*H01M 4/02*   (2006.01)
(Continued)

(52) U.S. Cl.
CPC ........ *H01M 4/5815* (2013.01); *H01M 4/136* (2013.01); *H01M 10/052* (2013.01);
(Continued)

(58) Field of Classification Search
CPC .................................................. H01M 10/0569
See application file for complete search history.

(56) References Cited

U.S. PATENT DOCUMENTS

2005/0019655 A1   1/2005   Miyake et al.
2013/0040185 A1   2/2013   Takase
(Continued)

FOREIGN PATENT DOCUMENTS

CN   105993093 A   10/2016
CN   106233482 A   12/2016
(Continued)

OTHER PUBLICATIONS

Cheng et al., "Solvent Handbook", Chemical Industry Press, 2nd Edition, SCT201967-90, ISBN 7-5025-1346-9, 1994, pp. 649, 652-653, with English translation.
(Continued)

*Primary Examiner* — Stephan J Essex
(74) *Attorney, Agent, or Firm* — Birch, Stewart, Kolasch & Birch, LLP (57) ABSTRACT

A lithium-sulfur secondary battery comprising a positive electrode, a negative electrode, a separator, and an electrolyte solution are provided. The positive electrode has an SC factor value of 0.45 or more. The electrolyte solution includes a solvent and a lithium salt, and the solvent includes a first solvent having a $DV^2$ factor value of 1.7 or less, and a second solvent which is a fluorinated ether-based solvent.

7 Claims, 1 Drawing Sheet

(51) Int. Cl.
*H01M 4/136* (2010.01)
*H01M 10/052* (2010.01)
*H01M 10/0569* (2010.01)

(52) U.S. Cl.
CPC .. *H01M 10/0569* (2013.01); *H01M 2004/027* (2013.01); *H01M 2004/028* (2013.01); *H01M 2300/0028* (2013.01)

(56) References Cited

U.S. PATENT DOCUMENTS

| | | |
|---|---|---|
| 2013/0280600 A1 | 10/2013 | Uehara et al. |
| 2013/0337347 A1* | 12/2013 | Pol .................. H01M 4/583 568/18 |
| 2014/0322618 A1 | 10/2014 | Braun |
| 2016/0285135 A1 | 9/2016 | Tsukahara et al. |
| 2017/0033406 A1* | 2/2017 | Zhang ................ H01M 10/052 |
| 2017/0054180 A1 | 2/2017 | Fukushima et al. |
| 2017/0125171 A1 | 5/2017 | Lee et al. |
| 2017/0352920 A1 | 12/2017 | Kawai et al. |
| 2018/0062206 A1 | 3/2018 | Yang et al. |
| 2018/0248227 A1 | 8/2018 | Park et al. |
| 2018/0301739 A1 | 10/2018 | Park et al. |
| 2018/0331391 A1 | 11/2018 | Lee et al. |
| 2019/0051940 A1 | 2/2019 | Park et al. |

FOREIGN PATENT DOCUMENTS

| | | |
|---|---|---|
| EP | 3 480 881 A1 | 5/2019 |
| JP | 2015-505825 A | 2/2015 |
| JP | 2017-178859 A | 10/2017 |
| JP | 2018-533824 A | 11/2018 |
| KR | 10-2013-0018511 A | 2/2013 |
| KR | 10-2015-0088913 A | 8/2015 |
| KR | 10-2017-0061692 A | 8/2017 |
| KR | 10-2017-0092455 A | 8/2017 |
| KR | 10-2017-0121047 A | 11/2017 |
| WO | WO 03/054986 A1 | 7/2003 |
| WO | WO 2015/166636 A1 | 11/2015 |
| WO | WO 2017/099420 A1 | 6/2017 |
| WO | WO 2018/007665 A1 | 1/2018 |

OTHER PUBLICATIONS

Cuisinier et al., "Unique behaviour of nonsolvents for polysulphides in lithium-sulphur batteries", Energy & Environmental Science, vol. 7, 2014, pp. 2697-2705.
Extended European Search Report for European Application No. 19874836.0, dated May 18, 2021.
Sohn et al., "Porous spherical polyacrylonitrile-carbon nanocomposite with high loading of sulfur for lithium-sulfur batteries", Journal of Power Sources, vol. 302, Oct. 24, 2015, pp. 70-78.
Fotouhi et al., "Lithium-Sulfur Battery Technology Readiness and Applications—A Review" Energies, vol. 10, 2017, 1937 (pp. 1-15).
International Search Report issued in PCT/KR2019/014039 (PCT/ISA/210), dated Jan. 31, 2020.
Yang et al., "Structural Design of Lithium-Sulfur Batteries: From Fundamental Research to Practical Application", Electrochemical Energy Reviews, vol. 1, 2018, pp. 239-293.
Hengde Li, Chief Editor, "Modern Material Science and Engineering Dictionary," Shandong Science and Technology Press, Aug. 2001, pp. 670-671, with English translation (total 11pages).

* cited by examiner

LITHIUM-SULFUR SECONDARY BATTERY

TECHNICAL FIELD

This application claims the benefits of priorities based on Korean Patent Application No. 10-2018-0128729 filed on Oct. 26, 2018 and Korean Patent Application No. 10-2019-0131538 filed on Oct. 22, 2019, the entire contents of which are incorporated herein by reference.

The present invention relates to a lithium-sulfur secondary battery.

BACKGROUND ART

As the application area of secondary battery are expanding to the electric vehicles (EV) and the energy storage devices (ESS), the lithium-ion secondary battery with relatively low weight-to-energy storage density (~250 Wh/kg) is facing limitations in application to such products. Alternatively, since the lithium-sulfur secondary battery has the theoretically high weight-to-energy storage density (~2,600 Wh/kg), it is attracting attention as a next-generation secondary battery technology.

The lithium-sulfur secondary battery means a battery system using a sulfur-based material having a sulfur-sulfur bond (S—S bond) as a positive electrode active material and using lithium metal as a negative electrode active material. Sulfur, which is the main material of the positive electrode active material has advantages that it is very rich in resources, is not toxic, and has a low atomic weight.

In the lithium-sulfur secondary battery, when discharging the battery, lithium which is a negative electrode active material is oxidized while releasing electron and thus ionizing, and the sulfur-based material which is a positive electrode active material is reduced while accepting the electron. In that case, the oxidation reaction of lithium is a process by which lithium metal releases electron and is converted to lithium cation form. In addition, the reduction reaction of sulfur is a process by which the S—S bond accepts two electrons and is converted to a sulfur anion form. The lithium cation produced by the oxidation reaction of lithium is transferred to the positive electrode through the electrolyte and is combined with the sulfur anion generated by the reduction reaction of sulfur to form a salt. Specifically, sulfur before discharging has a cyclic $S_8$ structure, which is converted to lithium polysulfide ($LiS_x$) by the reduction reaction. When the lithium polysulfide is completely reduced, lithium sulfide ($Li_2S$) is produced.

Sulfur in a solid form, which is a positive electrode active material, is difficult to ensure reactivity with electrons and lithium ions due to its low electrical conductivity. The existing lithium-sulfur secondary battery generates intermediate polysulfide in $Li_2S_x$ form in order to improve the reactivity of this sulfur and thus induces liquid phase reaction to improve reactivity. In this case, ether solvents such as dioxolane and dimethoxyethane, which are highly soluble in lithium polysulfide, are used as the solvent of the electrolyte solution. In addition, the existing lithium-sulfur secondary battery is to be constructed as a catholyte-type lithium-sulfur secondary battery system to improve the reactivity. In this case, the reactivity and lifetime characteristics of sulfur are affected depending on the content of the electrolyte solution due to the characteristics of the lithium polysulfide dissolved in the electrolyte solution. In order to construct a high energy density, a low content of the electrolyte solution should be injected, but as the content of the electrolyte solution is decreased, the concentration of lithium polysulfide in the electrolyte solution is increased, and thus, normal operation of the battery is difficult due to the decrease in fluidity of the active material and the increase in side reactions.

In order to construct a lithium-sulfur secondary battery having a high energy density, there is a need for a battery system capable of driving an electrode having high loading and low porosity, and research on such a battery system is continuously performed in this technical field.

PRIOR ART DOCUMENT

Non-Patent Document (Non-Patent Document 1) Abbas Fotouhi et al., Lithium-Sulfur Battery Technology Readiness and Applications—A Review, Energies 2017, 10, 1937.

DISCLOSURE

Technical Problem

In order to solve the above problems, the present invention is to provide a lithium-sulfur secondary battery that can implement a lithium-sulfur secondary battery of high energy density by adjusting the positive electrode and electrolyte solution to a specific condition.

Technical Solution

According to the first aspect of the invention, the present invention provides a lithium-sulfur secondary battery comprising a positive electrode, a negative electrode, a separator, and an electrolyte solution.

In one embodiment of the present invention, the positive electrode has an SC factor value of 0.45 or more represented by Equation 1 below.

$$SC\ factor = \alpha \times \frac{L}{P} \quad \text{[Equation 1]}$$

wherein P is the porosity (%) of the positive electrode active material layer in the positive electrode, L is the mass of sulfur (mg/cm$^2$) per unit area of the positive electrode active material layer in the positive electrode, and $\alpha$ is 10 (constant).

In one embodiment of the present invention, the electrolyte solution includes a solvent and a lithium salt, and the solvent includes a first solvent having a DV$^2$ factor value of 1.75 or less represented by Equation 2 below and a second solvent that is a fluorinated ether-based solvent.

$$DV^2\ factor = \gamma \times \frac{\mu}{DV} \quad \text{[Equation 2]}$$

wherein DV is the dipole moment per unit volume (D·mol/L), $\mu$ is the viscosity of the solvent (cP, 25° C.), and $\gamma$ is 100 (constant).

In one embodiment of the invention, the first solvent has a DV$^2$ factor value of 1.5 or less.

In one embodiment of the present invention, the lithium-sulfur secondary battery has an NS factor value of 3.5 or less represented by Equation 3 below.

$$\text{NS factor} = \frac{DV^2 \text{ factor}}{SC \text{ factor}} \qquad \text{[Equation 3]}$$

wherein SC factor is equal to the value defined by Equation 1, and $DV^2$ factor is equal to the value defined by Equation 2.

In one embodiment of the present invention, the lithium-sulfur secondary battery has an ED factor value of 850 or more represented by Equation 4 below.

$$\text{ED factor} = V \times SC \text{ factor} \times \frac{C}{D} \qquad \text{[Equation 4]}$$

wherein V is the nominal discharging voltage (V) for $Li/Li^+$, D is the density of electrolyte solution ($g/cm^2$), C is the discharging capacity (mAh/g) at the time of discharging at 0.1 C rate, and SC factor is equal to the value defined by Equation 1 above.

In one embodiment of the invention, the first solvent is selected from the group consisting of propionitrile, dimethylacetamide, dimethylformamide, gamma-butyrolactone, triethylamine, 1-iodopropane, and combinations thereof.

In one embodiment of the invention, the second solvent is selected from the group consisting of 1H,1H,2'H,3H-decafluorodipropyl ether, difluoromethyl 2,2,2-trifluoroethyl ether, 1,2,2,2-tetrafluoroethyl trifluoromethyl ether, 1,1,2,3,3,3-hexafluoropropyl difluoromethyl ether, pentafluoroethyl 2,2,2-trifluoroethyl ether, 1H, 1H,2'H-perfluorodipropyl ether, and combinations thereof.

In one embodiment of the invention, the solvent comprises the first solvent in an amount of 1 to 50% by weight.

In one embodiment of the invention, the solvent comprises a second solvent in an amount of 50 to 99% by weight.

In one embodiment of the present invention, the solvent comprises the first solvent and the second solvent in a weight ratio of 3:7 to 1:9.

Advantageous Effects

The lithium-sulfur secondary battery according to the present invention has a high energy density that was difficult to implement with a conventional lithium-sulfur secondary battery, by adjusting the positive electrode and the electrolyte solution to a specific condition.

BEST MODE

All of the embodiments provided according to the present invention can be achieved by the following description. It is to be understood that the following description describes preferred embodiments of the present invention, and the present invention is not necessarily limited thereto.

With respect to the physical properties described herein, when the measurement conditions and methods are not specifically described, the physical properties are measured according to the measurement conditions and methods generally used by those skilled in the art.

The present invention provides a lithium-sulfur secondary battery comprising a positive electrode, a negative electrode, a separator, and an electrolyte solution. The lithium-sulfur secondary battery according to the present invention comprises a positive electrode having a low porosity and a high loading amount of sulfur which is a positive electrode active material. In a positive electrode, if the porosity is lowered and the content of the positive electrode active material is increased, the energy density of the battery comprising such a positive electrode is increased. However, in a lithium-sulfur secondary battery, if the porosity of the positive electrode is reduced to the minimum and the content of sulfur is increased to the maximum, since the proportion of electrolyte solution per unit sulfur content is reduced, when applying the positive electrode to a lithium-sulfur secondary battery, it is difficult to achieve a target performance. The present invention is to provide a lithium-sulfur secondary battery having a higher energy density than the existing lithium-sulfur secondary battery at the time of implementation, by defining the conditions related to sulfur in the positive electrode and specifying an appropriate electrolyte solution condition thereto.

In the present invention, the positive electrode is not particularly limited, but may be an electrode having a positive electrode active material layer formed on one side of a current collector. If the positive electrode is an electrode having a positive electrode active material layer formed on one side of a current collector, the positive electrode may be prepared by applying a slurry of a positive electrode active material containing a positive electrode active material on one side of a current collector and then drying the slurry. In this case, the slurry may further comprise additives such as binders and electrically conductive materials, fillers, and dispersants in addition to the positive electrode active material.

The positive electrode active material may comprise elemental sulfur ($S_8$), sulfur-based compounds, or mixtures thereof. The sulfur-based compound may specifically be $Li_2S_n$ ($n \geq 1$), an organic sulfur compound or a carbon-sulfur polymer (($C_2S_x)_n$: x=2.5~50, $n \geq 2$). Since there sulfur material alone does not have electrical conductivity, it is applied in combination with an electrically conductive material.

The binder is a component that assists in bonding between the positive electrode active material and the electrically conductive material and bonding to the current collector, and may typically be added in an amount of 1 wt. % to 30 wt. % based on the total amount of the slurry of the positive electrode active material. The binder is not particularly limited, but may be, for example, at least one selected from the group consisting of polyvinylidene fluoride-hexafluoropropylene (PVDF-co-HFP), polyvinylidene fluoride, polyacrylonitrile, polymethyl methacrylate, polyvinyl alcohol, carboxymethylcellulose (CMC), starch, hydroxypropyl cellulose, regenerated cellulose, polyvinyl pyrrolidone, polytetrafluoroethylene, polyethylene, polypropylene, polyacrylic acid, ethylene-propylene-diene monomer (EPDM), sulfonated-EPDM, styrene-butadiene rubber (SBR), fluorine rubber, and the mixture of two or more thereof.

The electrically conductive material is not particularly limited, but may be, for example, graphites such as natural graphite or artificial graphite; carbon blacks such as carbon black (super-p), acetylene black, Ketjen black, channel black, furnace black, lamp black, thermal black, and Denka black; electrically conductive fibers such as carbon fiber or metal fiber; carbon fluoride; metal powders such as aluminum and nickel powder; electrically conductive whiskers such as zinc oxide and potassium titanate; electrically conductive metal oxides such as titanium oxide; or electrically conductive materials such as polyphenylene derivatives. The electrically conductive material may typically be present in an amount of 0.05 wt. % to 5 wt. % based on the total weight of the slurry of the positive electrode active material.

The filler is a component for inhibiting the expansion of a positive electrode. The filler may be used or not, depending on necessity, and is not particularly limited as long as it is a fibrous material without causing chemical changes in the battery, and examples thereof may include olefinic polymers such as polyethylene and polypropylene; fibrous materials such as glass fibers and carbon fibers.

The dispersing agent (dispersion) is not particularly limited, but may be, for example, isopropyl alcohol, N-methylpyrrolidone (NMP), acetone and the like.

The coating can be performed by a method commonly known in the art, but can be performed, for example, by distributing a slurry of positive electrode active material on one side of the positive electrode current collector and then uniformly dispersing the slurry using a doctor blade or the like. In addition, the coating can be performed by a method such as die casting, comma coating, screen printing and the like.

The drying is not particularly limited, but may be performed within one day in a vacuum oven at 50° C. to 200° C.

The positive electrodes of the present invention manufactured by the above-described materials and methods are distinguished by SC factor values represented by Equation 1 below.

$$SC \text{ factor} = \alpha \times \frac{L}{P}$$ [Equation 1]

wherein P is the porosity (%) of the positive electrode active material layer in the positive electrode, L is the mass of sulfur (mg/cm$^2$) per unit area of the positive electrode active material layer in the positive electrode, and $\alpha$ is 10 (constant). The lithium-sulfur secondary battery according to the present invention realizes a high energy density by organic coupling of not only the positive electrode but also the negative electrode, separator and electrolyte. According to an embodiment of the present invention, in order to realize a high energy density of the lithium-sulfur secondary battery, the SC factor value may be 0.45 or more, preferably 0.5 or more. In the present invention, the upper limit of the SC factor value is not particularly limited, but considering the actual embodiment of the lithium-sulfur secondary battery, the SC factor value may be 4.5 or less. In the case of a conventional lithium-sulfur secondary battery, if the SC factor value is 0.45 or more, performance such as energy density of the battery in actual implementation is reduced, but in the case of the lithium-sulfur secondary battery according to the present invention, the performance of the battery is maintained without degradation in actual implementation.

In the present invention, the negative electrode comprises a negative electrode current collector, and a negative electrode active material layer formed on the negative electrode current collector.

The negative electrode active material layer includes a negative electrode active material, a binder, and an electrically conductive material. The negative electrode active material may comprise a material capable of reversibly intercalating or de-intercalating lithium ion (Li$^+$), a material capable of reacting with lithium ion to reversibly form lithium containing compounds, lithium metal, or lithium alloy. The material capable of reversibly intercalating or de-intercalating lithium ion (Li$^+$) can be, for example, crystalline carbon, amorphous carbon, or a mixture thereof. The material capable of reacting with lithium ion (Li$^+$) to reversibly form lithium containing compounds may be, for example, tin oxide, titanium nitrate, or silicon. The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

The binder is not limited to the binder described above, and any binder can be used as long as it can be used as a binder in the art.

Except for the negative electrode active material and the electrically conductive material, the current collector, etc. may be configured by the materials and methods used in the positive electrode described above.

In the present invention, the separator is a physical separator having a function of physically separating an electrode, which can be used without any particular limitations as long as it is used as a conventional separator. The separator is particularly preferable as long as it has excellent ability to impregnate the electrolyte solution while exhibiting a low resistance to the movement of ions in the electrolyte solution.

In addition, the separator enables the lithium ion to be transported between the positive electrode and the negative electrode while separating or insulating the positive electrode and the negative electrode from each other. The separator may be made of a porous, nonconductive or insulating material having a porosity of 30 to 50%.

Specifically, a porous polymer film, for example, a porous polymer film made of a polyolefin-based polymer such as ethylene homopolymer, propylene homopolymer, ethylene/butene copolymer, ethylene/hexene copolymer, ethylene/methacrylate copolymer, etc. may be used, and a nonwoven fabric made of glass fiber having high melting point or the like can be used. Among them, the porous polymer film is preferably used.

If the polymer film is used for both the buffer layer and the separator, the impregnation amount and ion conduction characteristics of the electrolyte solution are decreased and the effect of reducing the overvoltage and improving the capacity characteristics becomes insignificant. On the contrary, if the nonwoven fabric material is used for both the buffer layer and the separator, a mechanical stiffness cannot be ensured and thus a problem of short circuit of the battery occurs. However, if a film-type separator and a polymer nonwoven fabric buffer layer are used together, the mechanical strength can also be ensured together with the effect of improving the performance of the battery due to the adoption of the buffer layer.

According to one preferred embodiment of the present invention, the ethylene homopolymer (polyethylene) polymer film is used as a separator, and the polyimide nonwoven fabric is used as a buffer layer. In that case, the polyethylene polymer film preferably has a thickness of 10 to 25 μm and a porosity of 40 to 50%.

In the present invention, the electrolyte solution is a non-aqueous electrolyte solution containing a lithium salt, which is composed of a lithium salt and a solvent. The electrolyte solution has a density of less than 1.5 g/cm³. If the electrolyte solution has a density of 1.5 g/cm³ or more, it is difficult to realize a high energy density of a lithium-sulfur secondary battery due to an increase in the weight of the electrolyte solution.

The lithium salt is a substance which can be easily dissolved in a non-aqueous organic solvent, and may be, for example, at least one selected from the group consisting of LiCl, LiBr, LiI, LiClO$_4$, LiBF$_4$, LiB$_{10}$Cl$_{10}$, LiB(Ph)$_4$, LiCABO$_8$, LiPF$_6$, LiCF$_3$SO$_3$, LiCF$_3$CO$_2$, LiAsF$_6$, LiSbF$_6$, LiAlCl$_4$, LiSO$_3$CH$_3$, LiSO$_3$CF$_3$, LiSCN, LiC(CF$_3$SO$_2$)$_3$, LIN (CF$_3$SO$_2$)$_2$, LiN(C$_2$F$_5$SO$_2$)$_2$, LiN(SO$_2$F)$_2$, lithium chloroborane, lithium lower aliphatic carboxylate, lithium tetraphenyl borate, and lithium imide. In one embodiment of the present invention, the lithium salt may preferably be lithium imide such as LiTFSI.

The concentration of the lithium salt may be 0.1 to 8.0 M, preferably 0.5 to 5.0 M, more preferably 1.0 to 3.0 M depending on various factors such as the exact composition of the electrolyte solution mixture, the solubility of the salt, the conductivity of the dissolved salt, the charge and discharge conditions of the battery, the operating temperature and other factors known in the lithium secondary battery field. If the concentration of the lithium salt is less than the above range, the conductivity of the electrolyte solution may be lowered and thus the performance of the battery may be deteriorated. If the concentration of the lithium salt exceeds the above range, the viscosity of the electrolyte solution may increase and thus the mobility of the lithium ion (Li$^+$) may be reduced. Accordingly, it is preferable to select an appropriate concentration of the lithium salt within the above range.

The solvent comprises a first solvent and a second solvent. The first solvent is one having the highest dipole moment per unit volume of the components contained in the solvent in an amount of at least 1% by weight, and thus it is characterized by having a high dipole moment and a low viscosity. When a solvent having a high dipole moment is used, an effect of improving the solid phase reactivity of sulfur is shown, which can be expressed well when the solvent itself has a low viscosity. In the present invention, the first solvent is distinguished by the DV² factor represented by Equation 2 below.

$$DV^2 \text{ factor} = \gamma \times \frac{\mu}{DV} \quad \text{[Equation 2]}$$

wherein DV is the dipole moment per unit volume (debye (D)·mol/L), μ is the viscosity of the solvent (cP, 25° C.), and γ is 100 (constant). According to an embodiment of the present invention, the DV² factor value may be 1.75 or less, preferably 1.5 or less. In the present invention, the lower limit of the DV² factor value is not particularly limited, but considering the actual embodiment of the lithium-sulfur secondary battery, the DV² factor value may be 0.1 or more. When a solvent having a DV² factor value of 1.75 or less, such as the first solvent, is mixed, even when a positive electrode having a low porosity and a high loading amount of sulfur, which is a positive electrode active material, is applied to a lithium-sulfur battery, the functionality of the electrolyte solution can be maintained as it is, so that the performance of the battery is not degraded.

In the present invention, if the first solvent has a DV² factor value in the above-described range, its kind is not particularly limited, but may be selected from the group consisting of propionitrile, dimethylacetamide, dimethylformamide, gamma-butyrolactone, triethylamine, 1-iodopropane, and combinations thereof. According to an embodiment of the present invention, the first solvent may be contained in an amount of 1 to 50% by weight, preferably 5 to 40% by weight, more preferably 10 to 30% by weight, based on the solvent constituting the electrolyte solution. If the solvent according to the present invention comprises the first solvent within the above-described range by weight percentage, the effect of improving the performance of the battery can be achieved even when used with the positive electrode having a low porosity and a high loading amount of sulfur which is a positive electrode active material.

The lithium-sulfur secondary battery of the present invention may be further distinguished by an NS factor obtained by combining the SC factor and the DV² factor. The NS factor is represented by Equation 3 below.

$$NS \text{ factor} = \frac{DV^2 \text{ factor}}{SC \text{ factor}} \quad \text{[Equation 3]}$$

wherein SC factor is equal to the value defined by Equation 1 above, and DV² factor is equal to the value defined by Equation 2 above. According to an embodiment of the present invention, the NS factor value may be 3.5 or less, preferably 3.0 or less, and more preferably 2.7 or less. In the present invention, the lower limit of the NS factor value is not particularly limited, but considering the actual embodiment of the lithium-sulfur secondary battery, the NS factor value may be 0.1 or more. When the NS factor value is adjusted into the above range, the effect of improving the performance of the lithium-sulfur secondary battery may be more excellent.

In the present invention, the second solvent is a fluorinated ether-based solvent. Conventionally, in order to control the viscosity of the electrolyte solution, a solvent such as dimethoxyethane, dimethylcarbonate, and the like is used as diluent. If such a solvent is used as a diluent, a battery comprising a high loading, low porosity positive electrode as in the present invention cannot be driven. Therefore, in the present invention, the second solvent is added together with the first solvent to drive the positive electrode according to the present invention. If the second solvent is a fluorinated ether-based solvent generally used in the art, its kind is not particularly limited, but may be selected from the group consisting of 1H,1H,2'H,3H-decafluorodipropyl ether, difluoromethyl 2,2,2-trifluoroethyl ether, 1,2,2,2-tetrafluoroethyl trifluoromethyl ether, 1,1,2,3,3,3-hexafluoropropyl difluoromethyl ether, pentafluoroethyl 2,2,2-trifluoroethyl ether, 1H, 1H,2'H-perfluorodipropyl ether, and combinations thereof. According to an embodiment of the present invention, the second solvent may be contained in an amount of 50 to 99% by weight, preferably 60 to 95% by weight, more preferably 70 to 90% by weight, based on the solvent constituting the electrolyte solution. When the solvent according to the present invention includes the second solvent within the above-described weight % range, like the first solvent, the effect of improving the performance of the battery can be achieved even when used with the positive electrode having a low porosity and a high loading amount of sulfur which is a positive electrode active material. When the first solvent and the second solvent are mixed, the second solvent may be contained in the electrolyte solution in an amount equal to or greater than that of the first solvent in consideration of the effect of improving the performance of the battery. According to an embodiment of the invention, the solvent may comprise the first solvent and the second solvent in a weight ratio of 1:1 to 1:9, preferably 3:7 to 1:9 (first solvent: second solvent).

The nonaqueous electrolyte solution for the lithium-sulfur battery of the present invention may further contain nitric acid or a nitrous acid-based compound as an additive. The nitric acid or a nitrous acid-based compound has the effect of forming a stable film on the lithium electrode and improving the charging/discharging efficiency. The nitric acid or nitrous acid-based compound is not particularly limited in the present invention, but may be at least one selected from the group consisting of inorganic nitric acid or nitrous acid-based compounds such as lithium nitrate ($LiNO_3$), potassium nitrate ($KNO_3$), cesium nitrate ($CsNO_3$), barium nitrate ($Ba(NO_3)_2$), ammonium nitrate ($NH_4NO_3$), lithium nitrite ($LiNO_2$), potassium nitrite ($KNO_2$), cesium nitrite ($CsNO_2$), ammonium nitrite ($NH_4NO_2$); organic nitric acid or nitrous acid-based compounds such as methyl nitrate, dialkyl imidazolium nitrate, guanidine nitrate, imidazolium nitrate, pyridinium nitrate, ethyl nitrite, propyl nitrite, butyl nitrite, pentyl nitrite, octyl nitrite; organic nitro compounds such as nitromethane, nitropropane, nitrobutane, nitrobenzene, dinitrobenzene, nitropyridine, dinitropyridine, nitrotoluene, dinitrotoluene, and combinations thereof, and preferably may be lithium nitrate.

In addition, the non-aqueous electrolyte solution may further comprise other additives for the purpose of improving charging/discharging characteristics, flame retardancy, and the like. Examples of the additives may be pyridine, triethylphosphite, triethanolamine, cyclic ether, ethylene diamine, n-glyme, hexamethyl phosphoric triamide, nitrobenzene derivatives, sulfur, quinone imine dyes, N-substituted oxazolidinone, N,N-substituted imidazolidine, ethylene glycol dialkyl ether, ammonium salt, pyrrole, 2-methoxy ethanol, aluminum trichloride, fluoroethylene carbonate (FEC), propene sultone (PRS), vinylene carbonate (VC) and the like.

The lithium-sulfur secondary battery of the present invention can be manufactured by disposing a separator between a positive electrode and a negative electrode to form an electrode assembly and inserting the electrode assembly into a cylindrical battery case or a rectangular battery case, and then injecting an electrolyte. Alternatively, the lithium-sulfur secondary battery of the present invention can be manufactured by laminating the electrode assembly, impregnating the electrode assembly with the electrolyte, putting the obtained result into a battery case and then sealing it.

The lithium-sulfur secondary battery according to the present invention is distinguished by an ED factor value represented by Equation 4 below.

$$ED \text{ factor} = V \times SC \text{ factor} \times \frac{C}{D} \qquad [\text{Equation 4}]$$

wherein V is the nominal discharging voltage (V) for $Li/Li^+$, D is the density of electrolyte solution ($g/cm^3$), C is the discharging capacity (mAh/g) at the time of discharging at 0.1 C rate, and SC factor is equal to the value defined by Equation 1 above. The higher the ED factor is, the higher the energy density of the lithium-sulfur secondary battery can be actually implemented. According to an embodiment of the present invention, the ED factor value may be 850 or more, preferably 870 or more, more preferably 891 or more. In the present invention, the upper limit of the ED factor value is not particularly limited, but considering the actual embodiment of the lithium-sulfur secondary battery, the ED factor value may be 10,000 or less. The range of the ED factor value means that the lithium-sulfur secondary battery according to the present invention can implement an improved energy density than the conventional lithium-sulfur secondary battery.

Hereinafter, preferred examples are provided to assist in understanding the present invention, but the following examples are provided only for better understanding of the present invention, and the present invention is not limited thereto.

EXAMPLES

Example 1

Sulfur, Super-P (SP), an electrically conductive material and a binder were mixed by a ball mill to prepare a composition for forming a positive electrode active material layer, while using water as a solvent. In this case, Denka black was used as the conductive material, and a mixed binder of SBR and CMC was used as the binder, and the mixing ratio of sulfur and SP (9:1 ratio):conductive material: binder was 90:10:10 by weight. The prepared composition for forming the positive electrode active material layer was applied to an aluminum current collector and then dried to prepare a positive electrode (energy density of positive electrode: 6.18 $mAh/cm^2$). The porosity of the positive electrode active material layer calculated by measuring electrode weight and electrode thickness (using TESA-µHITE equipment from TESA company) on the prepared positive electrode was 74%. The mass of sulfur per unit area of the positive electrode active material layer was 3.75 $mg/cm^2$. The SC factor value calculated on the basis of these values was 0.50.

After the positive electrode prepared by the above-described method and the negative electrode was positioned to face, a polyethylene separator having a thickness of 20 µm and a porosity of 45% was interposed between the positive electrode and the negative electrode.

Thereafter, an electrolyte solution was injected into the case to manufacture a lithium-sulfur secondary battery. The electrolyte solution was prepared by dissolving lithium bis (trifluoromethyl sulfonyl) imide (LiTFSI) in an organic solvent at a concentration of 3M. The organic solvent was a solvent obtained by mixing propionitrile (first solvent) and 1H, 1H, 2'H, 3H-decafluorodipropyl ether (second solvent) in a weight ratio of 3:7. The dipole moment per unit volume in the first solvent was 97.1 D·mol/L, and the viscosity (25° C.) of the solvent measured using an LVDV2T-CP viscometer from BROOKFIELD AMETEK company was 0.38 cP. The $DV^2$ factor calculated on the basis of these values was 0.39.

Example 2

A lithium-sulfur secondary battery was manufactured in the same manner as in Example 1, except that by changing the preparation condition of the positive electrode, a positive electrode was prepared in such a manner so that the porosity of the positive electrode active material layer is 74%, the mass of sulfur per unit area of the positive electrode active material layer is 3.33 mg/cm², and the SC factor value calculated on the basis of these values is 0.45.

Comparative Example 1

A lithium-sulfur secondary battery was manufactured in the same manner as in Example 1, except that by changing the preparation condition of the positive electrode, a positive electrode was prepared in such a manner so that the porosity of the positive electrode active material layer is 78%, the mass of sulfur per unit area of the positive electrode active material layer is 2.33 mg/cm², and the SC factor value calculated on the basis of these values is 0.30.

Comparative Example 2

A lithium-sulfur secondary battery was manufactured in the same manner as in Example 1, except that by changing the preparation condition of the positive electrode, a positive electrode was prepared in such a manner so that the porosity of the positive electrode active material layer is 76%, the mass of sulfur per unit area of the positive electrode active material layer is 2.67 mg/cm², and the SC factor value calculated on the basis of these values is 0.35.

Comparative Example 3

A lithium-sulfur secondary battery was manufactured in the same manner as in Example 1, except that by changing the preparation condition of the positive electrode, a positive electrode was prepared in such a manner so that the porosity of the positive electrode active material layer is 75%, the mass of sulfur per unit area of the positive electrode active material layer is 3.1 mg/cm², and the SC factor value calculated based on this is 0.41.

Comparative Example 4

A lithium-sulfur secondary battery was manufactured in the same manner as in Example 1, except that by changing the preparation condition of the electrolyte solution, an electrolyte solution prepared by dissolving lithium bis(trifluoromethyl sulfonyl) imide (LiTFSI) of 1 M concentration and 1 wt. % of $LiNO_3$ in an organic solvent prepared by mixing 1,3-dioxolane and 1,2-dimethoxyethane in a volume ratio of 1:1 was used.

Comparative Example 5

A lithium-sulfur secondary battery was manufactured in the same manner as in Example 2, except that by changing the preparation condition of the electrolyte solution, an electrolyte solution prepared by dissolving lithium bis(trifluoromethyl sulfonyl) imide (LiTFSI) of 1 M concentration and 1 wt. % of $LiNO_3$ in an organic solvent prepared by mixing 1,3-dioxolane and 1,2-dimethoxyethane in a volume ratio of 1:1 was used.

Comparative Example 6

A lithium-sulfur secondary battery was manufactured in the same manner as in Comparative Example 1, except that by changing the preparation condition of the electrolyte solution, an electrolyte solution prepared by dissolving lithium bis(trifluoromethyl sulfonyl) imide (LiTFSI) of 1 M concentration and 1 wt. % of $LiNO_3$ in an organic solvent prepared by mixing 1,3-dioxolane and 1,2-dimethoxyethane in a volume ratio of 1:1 was used.

Comparative Example 7

A lithium-sulfur secondary battery was manufactured in the same manner as in Comparative Example 2, except that by changing the preparation condition of the electrolyte solution, an electrolyte solution prepared by dissolving lithium bis(trifluoromethyl sulfonyl) imide (LiTFSI) of 1 M concentration and 1 wt. % of $LiNO_3$ in an organic solvent prepared by mixing 1,3-dioxolane and 1,2-dimethoxyethane in a volume ratio of 1:1 was used.

Comparative Example 8

A lithium-sulfur secondary battery was manufactured in the same manner as in Comparative Example 3, except that by changing the preparation condition of the electrolyte solution, an electrolyte solution prepared by dissolving lithium bis(trifluoromethyl sulfonyl) imide (LiTFSI) of 1 M concentration and 1 wt. % of $LiNO_3$ in an organic solvent prepared by mixing 1,3-dioxolane and 1,2-dimethoxyethane in a volume ratio of 1:1 was used.

The conditions of Examples 1 and 2 and Comparative Examples 1 to 8 are summarized in Table 1 below.

TABLE 1

| | Composition of electrolyte solution | SC factor |
|---|---|---|
| Example 1 | Composition of the first electrolyte solution[1] | 0.50 |
| Example 2 | | 0.45 |
| Comparative Example 1 | | 0.30 |
| Comparative Example 2 | | 0.35 |
| Comparative Example 3 | | 0.41 |
| Comparative Example 4 | Composition of the second electrolyte solution[2] | 0.50 |
| Comparative Example 5 | | 0.45 |
| Comparative Example 6 | | 0.30 |
| Comparative Example 7 | | 0.35 |
| Comparative Example 8 | | 0.41 |

[1]Composition of the first electrolyte solution = propionitrile:1H,1H,2'H,3H-decafluorodipropyl ether (3:7, w/w) solvent, 3.0M LiTFSI
[2]Composition of the second electrolyte solution = 1,3-dioxolan:1,2-dimethoxyethane (1:1, v/v) solvent, 1.0M LiTFSI, 1.0 wt % $LiNO_3$

Example 3

A lithium-sulfur secondary battery was manufactured in the same manner as in Example 1, except that by changing the preparation condition of the electrolyte solution, dimethylacetamide instead of propionitrile was used as the first solvent, which has a dipole moment per unit volume of 59.29 D·mol/L, a solvent viscosity (25° C.) of 0.61 cP, and a $DV^2$ factor value of 1.02 calculated on the basis of these values.

Example 4

A lithium-sulfur secondary battery was manufactured in the same manner as in Example 1, except that by changing the preparation condition of the electrolyte solution, dimethylformamide instead of propionitrile was used as the first solvent, which has a dipole moment per unit volume of 71.04 D·mol/L, a solvent viscosity (25° C.) of 0.51 cP, and a $DV^2$ factor value of 0.71 calculated on the basis of these values.

Example 5

A lithium-sulfur secondary battery was manufactured in the same manner as in Example 1, except that by changing the preparation condition of the electrolyte solution, gamma-butyrolactone instead of propionitrile was used as the first solvent, which has a dipole moment per unit volume of 84.91 D·mol/L, a solvent viscosity (25° C.) of 1.03 cP, and a $DV^2$ factor value of 1.21 calculated on the basis of these values.

Example 6

A lithium-sulfur secondary battery was manufactured in the same manner as in Example 1, except that by changing the preparation condition of the electrolyte solution, triethylamine instead of propionitrile was used as the first solvent, which has a dipole moment per unit volume of 136.8 D·mol/L, a solvent viscosity (25° C.) of 0.42 cP, and a $DV^2$ factor value of 0.31 calculated on the basis of these values.

Example 7

A lithium-sulfur secondary battery was manufactured in the same manner as in Example 1, except that by changing the preparation condition of the electrolyte solution, 1-iodopropane instead of propionitrile was used as the first solvent, which has a dipole moment per unit volume of 32.42 D·mol/L, a solvent viscosity (25° C.) of 0.45 cP, and a DW factor value of 1.40 calculated on the basis of these values.

Comparative Example 9

A lithium-sulfur secondary battery was manufactured in the same manner as in Example 1, except that by changing the preparation condition of the electrolyte solution, 1,3-dioxolane instead of propionitrile was used as the first solvent, which has a dipole moment per unit volume of 33.66 D·mol/L, a solvent viscosity (25° C.) of 0.7 cP, and a $DV^2$ factor value of 2.07 calculated on the basis of these values.

Comparative Example 10

A lithium-sulfur secondary battery was manufactured in the same manner as in Example 1, except that by changing the preparation condition of the electrolyte solution, 1,2-dimethoxyethane instead of propionitrile was used as the first solvent, which has a dipole moment per unit volume of 20.54 D·mol/L, a solvent viscosity (25° C.) of 0.48 cP, and a $DV^2$ factor value of 2.33 calculated on the basis of these values.

Comparative Example 11

A lithium-sulfur secondary battery was manufactured in the same manner as in Example 1, except that by changing the preparation condition of the electrolyte solution, tetrahydrofuran instead of propionitrile was used as the first solvent, which has a dipole moment per unit volume of 25.79 D·mol/L, a solvent viscosity (25° C.) of 0.58 cP, and a $DV^2$ factor value of 2.24 calculated on the basis of these values.

Comparative Example 12

A lithium-sulfur secondary battery was manufactured in the same manner as in Example 1, except that by changing the preparation condition of the electrolyte solution, dimethyl sulfoxide instead of propionitrile was used as the first solvent, which has a dipole moment per unit volume of 59.43 D·mol/L, a solvent viscosity (25° C.) of 1.16 cP, and a DW factor value of 1.95 calculated on the basis of these values.

Comparative Example 13

A lithium-sulfur secondary battery was manufactured in the same manner as in Example 1, except that by changing the preparation condition of the electrolyte solution, propylene carbonate instead of propionitrile was used as the first solvent, which has a dipole moment per unit volume of 96.13 D·mol/L, a solvent viscosity (25° C.) of 1.71 cP, and a $DV^2$ factor value of 1.77 calculated on the basis of these values.

Comparative Example 14

A lithium-sulfur secondary battery was manufactured in the same manner as in Example 1, except that by changing the preparation condition of the electrolyte solution, dimethyl carbonate instead of propionitrile was used as the first solvent, which has a dipole moment per unit volume of 5.74 D·mol/L, a solvent viscosity (25° C.) of 0.57 cP, and a $DV^2$ factor value of 9.93 calculated on the basis of these values.

The conditions of Examples 1 and 3 to 7 and Comparative Examples 9 to 14 are summarized in Table 2 below. NS factor values were calculated and shown in Table 2 below.

TABLE 2

| | First solution | $DV^2$ factor | NS factor |
|---|---|---|---|
| Example 1 | Propionitrile | 0.39 | 0.78 |
| Example 3 | Dimethylacetamide | 1.02 | 2.04 |
| Example 4 | Dimethylformamide | 0.71 | 1.42 |
| Example 5 | Gamma-Butyrolactone | 1.21 | 2.42 |
| Example 6 | Triethylamine | 0.31 | 0.62 |
| Example 7 | 1-iodopropane | 1.40 | 2.80 |
| Comparative Example 9 | 1,3-Dioxolane | 2.07 | 4.14 |
| Comparative Example 10 | 1,2-Dimethoxyethane | 2.33 | 4.66 |
| Comparative Example 11 | Tetrahydrofuran | 2.24 | 4.48 |
| Comparative Example 12 | Dimethyl sulfoxide | 1.95 | 3.90 |
| Comparative Example 13 | Propylene carbonate | 1.77 | 3.54 |
| Comparative Example 14 | Dimethyl carbonate | 9.93 | 19.86 |

EXPERIMENTAL EXAMPLES

Experimental Example 1

Figure 1:
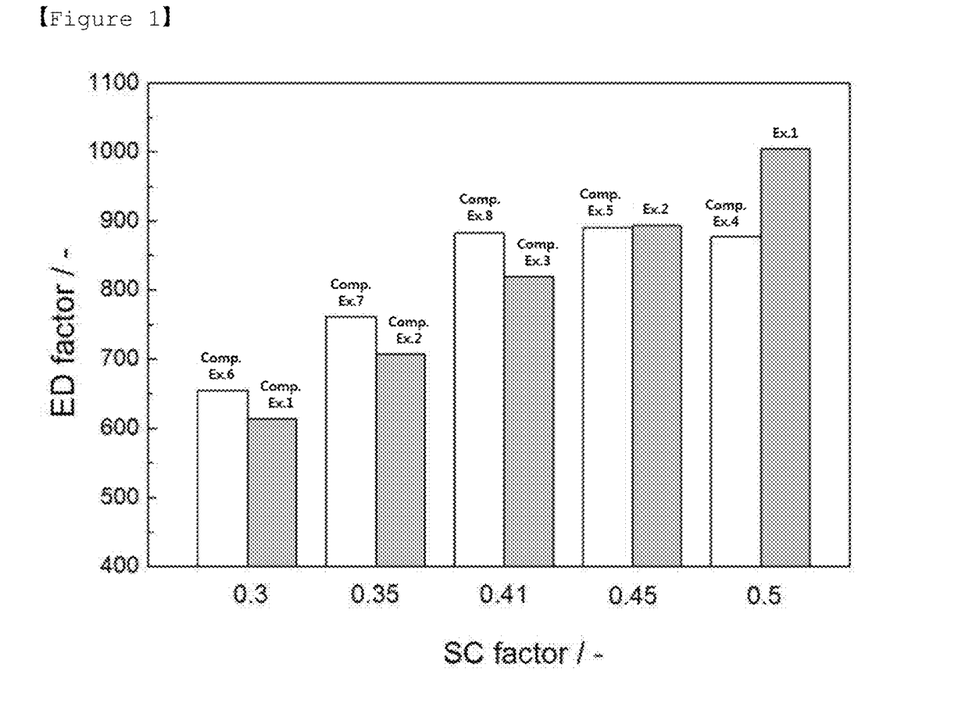
FIG. 1 is a graph showing the measured ED factor values of lithium-sulfur secondary batteries according to Examples 1 and 2 and Comparative Examples 1 to 8.

The ED factor values of lithium-sulfur secondary batteries according to Examples 1 and 2 and Comparative Examples 1 to 8 were measured and shown in Table 3 and FIG. 1.

TABLE 3

| | Composition of electrolyte solution | SC factor | ED factor |
|---|---|---|---|
| Example 1 | Composition of the first electrolyte solution[1] | 0.50 | 1004.6 |
| Example 2 | | 0.45 | 893.0 |
| Comparative Example 1 | | 0.30 | 593.1 |
| Comparative Example 2 | | 0.35 | 695.6 |
| Comparative Example 3 | | 0.41 | 819.4 |
| Comparative Example 4 | Composition of the second electrolyte solution[2] | 0.50 | 877.9 |
| Comparative Example 5 | | 0.45 | 890.8 |
| Comparative Example 6 | | 0.30 | 654.4 |
| Comparative Example 7 | | 0.35 | 761.4 |
| Comparative Example 8 | | 0.41 | 882.5 |

[1] Composition of the first electrolyte solution = propionitrile:1H,1H,2'H,3H-decafluorodipropyl ether (3:7, w/w) solvent, 3.0M LiTFSI
[2] Composition of the second electrolyte solution = 1,3-dioxolane:1,2-dimethoxyethane (1:1, v/v) solvent, 1.0M LiTFSI, 1.0 wt % LiNO$_3$ According to Table 3 and FIG. 1, the lithium-sulfur secondary batteries according to Examples 1 and 2 may have an ED factor value of 891 or more which cannot be implemented by the lithium-sulfur secondary battery having the composition of the second electrolyte solution or an SC factor of 0.41 or less. This means that the lithium-sulfur secondary battery according to the present invention can implement a higher energy density that could not be realized in the conventional lithium-sulfur secondary battery.

Experimental Example 2

Figure 2:
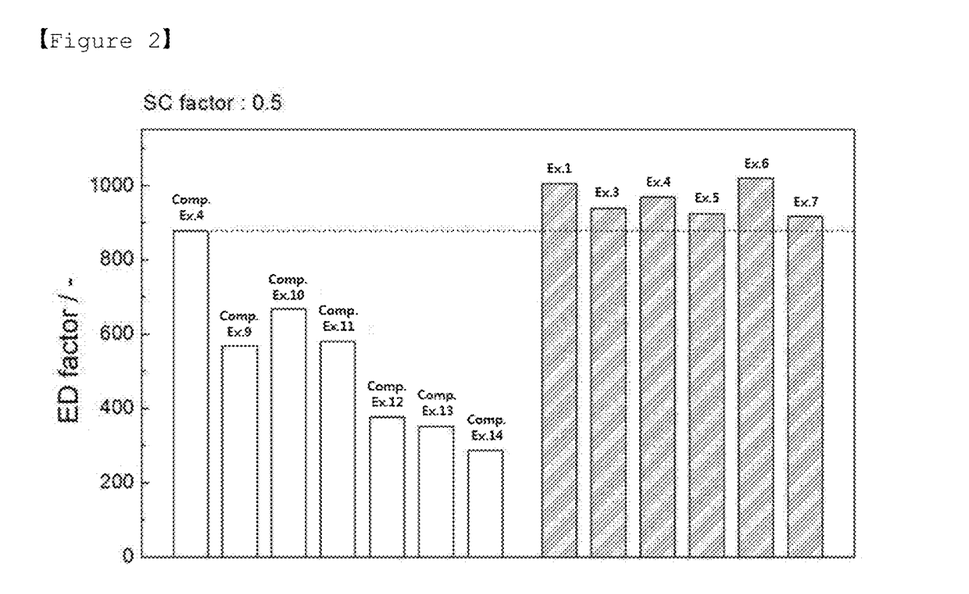
FIG. 2 is a graph showing the measured ED factor values of lithium-sulfur secondary batteries according to Examples 1 and 3 to 7 and Comparative Examples 9 to 14.

The ED factor values of lithium-sulfur secondary batteries according to Examples 1 and 3 to 7 and Comparative Examples 9 to 14 were measured and shown in Table 4 and FIG. 2.

TABLE 4

| | First solvent | DV$^2$ factor | NS factor | ED factor |
|---|---|---|---|---|
| Example 1 | Propionitrile | 0.39 | 0.78 | 1004.6 |
| Example 3 | Dimethylacetamide | 1.02 | 2.04 | 939.4 |
| Example 4 | Dimethylformamide | 0.71 | 1.42 | 968.8 |
| Example 5 | Gamma-Butyrolactone | 1.21 | 2.42 | 924.7 |
| Example 6 | Triethylamine | 0.31 | 0.62 | 1019.5 |
| Example 7 | 1-iodopropane | 1.40 | 2.80 | 917.4 |
| Comparative Example 9 | 1,3-Dioxolane | 2.07 | 4.14 | 567.6 |
| Comparative Example 10 | 1,2-Dimethoxyethane | 2.33 | 4.66 | 667.0 |
| Comparative Example 11 | Tetrahydrofuran | 2.24 | 4.48 | 580.5 |
| Comparative Example 12 | Dimethyl sulfoxide | 1.95 | 3.90 | 376.0 |
| Comparative Example 13 | Propylene carbonate | 1.77 | 3.54 | 352.4 |
| Comparative Example 14 | Dimethyl carbonate | 9.93 | 19.86 | 287.6 |

Referring to Table 4 and FIG. 2, when sulfur is heavily loaded with an SC factor of 0.5, the energy density of the lithium-sulfur secondary battery can be remarkably improved at the DV2 factor of 1.75 or less or the NS factor of 3.50 or less, as in Examples 1 and 3 to 7.

All of the simple modifications and variations of the present invention fall within the scope of the present invention, and the specific scope of protection of the present invention will be apparent from the appended claims.

The invention claimed is:

1. A lithium-sulfur secondary battery comprising a positive electrode, a negative electrode, a separator, and an electrolyte solution, wherein the positive electrode has an SC factor value of 0.45 or more represented by Equation 1 below:

$$SC\ factor = \alpha \times \frac{L}{P} \quad [\text{Equation 1}]$$

wherein P is the porosity (%) of the positive electrode active material layer in the positive electrode, L is the mass of sulfur (mg/cm$^2$) per unit area of the positive electrode active material layer in the positive electrode, and α is 10 (constant), wherein the electrolyte solution comprises a first solvent, a second solvent, and a lithium salt, wherein the first solvent is selected from the group consisting of propionitrile, dimethylacetamide, dimethylformamide, triethylamine, 1-iodopropane, and or combinations thereof, and wherein the second solvent is a fluorinated ether-based solvent.

2. The lithium-sulfur secondary battery according to claim 1, wherein the electrolyte solution comprises a solvent and a lithium salt, and the solvent includes a first solvent having a DV$^2$ factor value of 1.75 or less represented by Equation 2 below, and the lithium-sulfur secondary battery has an NS factor value of 3.5 or less represented by Equation 3 below:

$$DV^2\ factor = \gamma \times \frac{\mu}{DV} \quad [\text{Equation 2}]$$

wherein DV is the dipole moment per unit volume (debye (D)·mol/L), μ is the viscosity of the solvent (cP, 25° C.), and γ is 100 (constant), $$NS\ factor = \frac{DV^2\ factor}{SC\ factor} \quad [\text{Equation 3}]$$

wherein SC factor is equal to the value defined by Equation 1 above, and DV$^2$ factor is equal to the value defined by Equation 2 above.

3. The lithium-sulfur secondary battery according to claim 1, wherein the lithium-sulfur secondary battery has an ED factor value of 850 or more represented by Equation 4 below:

$$ED\ factor = V \times SC\ factor \times \frac{C}{D} \quad [\text{Equation 4}]$$

wherein V is the nominal discharging voltage (V) for Li/Li$^+$, D is the density of electrolyte solution (g/cm$^3$), C is the discharging capacity (mAh/g) at the time of discharging at 0.1 C rate, and SC factor is equal to the value defined by Equation 1 above.

4. The lithium-sulfur secondary battery according to claim 1, wherein the second solvent is selected from the group consisting of 1H, 1H,2'H,3H-decafluorodipropyl ether, difluoromethyl 2,2,2-trifluoroethyl ether, 1,2,2,2-tetrafluoroethyl trifluoromethyl ether, 1,1,2,3,3,3-hexafluoropropyl difluoromethyl ether, pentafluoroethyl 2,2,2-trifluoroethyl ether, 1H, 1H,2'H-perfluorodipropyl ether, and combinations thereof.

5. The lithium-sulfur secondary battery according to claim 1, wherein the solvent contains the first solvent in an amount of 1% by weight to 50% by weight.

6. The lithium-sulfur secondary battery according to claim 1, wherein the solvent contains the second solvent in an amount of 50% by weight to 99% by weight.

7. The lithium-sulfur secondary battery according to claim 1, wherein the solvent comprises the first solvent and the second solvent in a weight ratio of 3:7 to 1:9.

* * * * *